United States Patent [19]

Janotik

[11] Patent Number: 5,209,541
[45] Date of Patent: May 11, 1993

[54] SPACE FRAME JOINT CONSTRUCTION
[75] Inventor: Adam M. Janotik, Grosse Ile, Mich.
[73] Assignee: Ford Motor Company, Dearborn, Mich.
[21] Appl. No.: 867,565
[22] Filed: Apr. 13, 1992
[51] Int. Cl.⁵ .......................................... B62D 27/02
[52] U.S. Cl. ......................................... 296/29; 29/469;
  52/731.6; 280/785; 296/30; 296/197; 296/203;
  296/204; 296/209; 403/292
[58] Field of Search ................... 296/29, 30, 197, 203,
  296/204, 205, 209, 900; 280/785, 797, 798, 800;
  29/428, 469; 52/730, 731, 732; 403/292, 298

[56] References Cited
U.S. PATENT DOCUMENTS

| | | | |
|---|---|---|---|
| 1,972,309 | 9/1934 | McMurchy | 403/335 |
| 2,640,443 | 6/1953 | Schieler et al. | 105/404 |
| 3,093,219 | 6/1963 | Ramme | 138/117 |
| 3,100,556 | 8/1963 | De Ridder | 52/588 |
| 3,111,205 | 11/1963 | Gresham | 52/588 |
| 3,228,717 | 1/1966 | Waller et al. | 292/70 |
| 3,456,966 | 7/1969 | Müller | 403/7 |
| 3,472,301 | 10/1967 | Pearce, Jr. | 411/258 |
| 4,027,855 | 6/1977 | Lauzier | 256/21 |
| 4,040,640 | 8/1977 | Begg | 296/204 X |
| 4,163,572 | 8/1979 | Benscoter | 285/121 |
| 4,230,361 | 10/1980 | Nachbur et al. | 296/193 |
| 4,390,164 | 6/1983 | Cokelekoglu | 256/65 |
| 4,471,519 | 9/1984 | Capello et al. | 29/460 |
| 4,557,091 | 12/1985 | Auer | 52/282 |
| 4,618,163 | 10/1986 | Hasler et al. | 280/785 |
| 4,660,345 | 4/1987 | Browning | 52/648 |
| 4,676,545 | 6/1987 | Bonfilio et al. | 296/203 X |
| 4,726,166 | 2/1988 | De Rees | 52/730 X |
| 4,769,963 | 9/1988 | Meyerson | 52/309.9 |
| 4,912,826 | 4/1990 | Dixon et al. | 29/281.1 |
| 4,976,490 | 12/1990 | Gentle | 296/183 |

FOREIGN PATENT DOCUMENTS

| | | |
|---|---|---|
| 0061994 | 2/1982 | European Pat. Off. . |
| 0271137 | 11/1987 | European Pat. Off. . |
| 2701905 | 7/1977 | Fed. Rep. of Germany . |
| 2935158 | 3/1980 | Fed. Rep. of Germany . |
| 3529662 | 2/1987 | Fed. Rep. of Germany . |
| 3811427 | 10/1989 | Fed. Rep. of Germany . |
| 1497184 | 8/1967 | France . |
| 04679 | 8/1987 | PCT Int'l Appl. . |

Primary Examiner—Russell D. Stormer
Assistant Examiner—Andrew C. Pike
Attorney, Agent, or Firm—Daniel M. Stock; Roger L. May

[57] ABSTRACT

A space frame for an automotive vehicle includes a plurality of structural members. Each of the structural members has a channel. The space frame also includes a connector disposed in the channel of each of the structural members and a joint structure and/or adhesive for joining the connector and the structural members together.

16 Claims, 2 Drawing Sheets

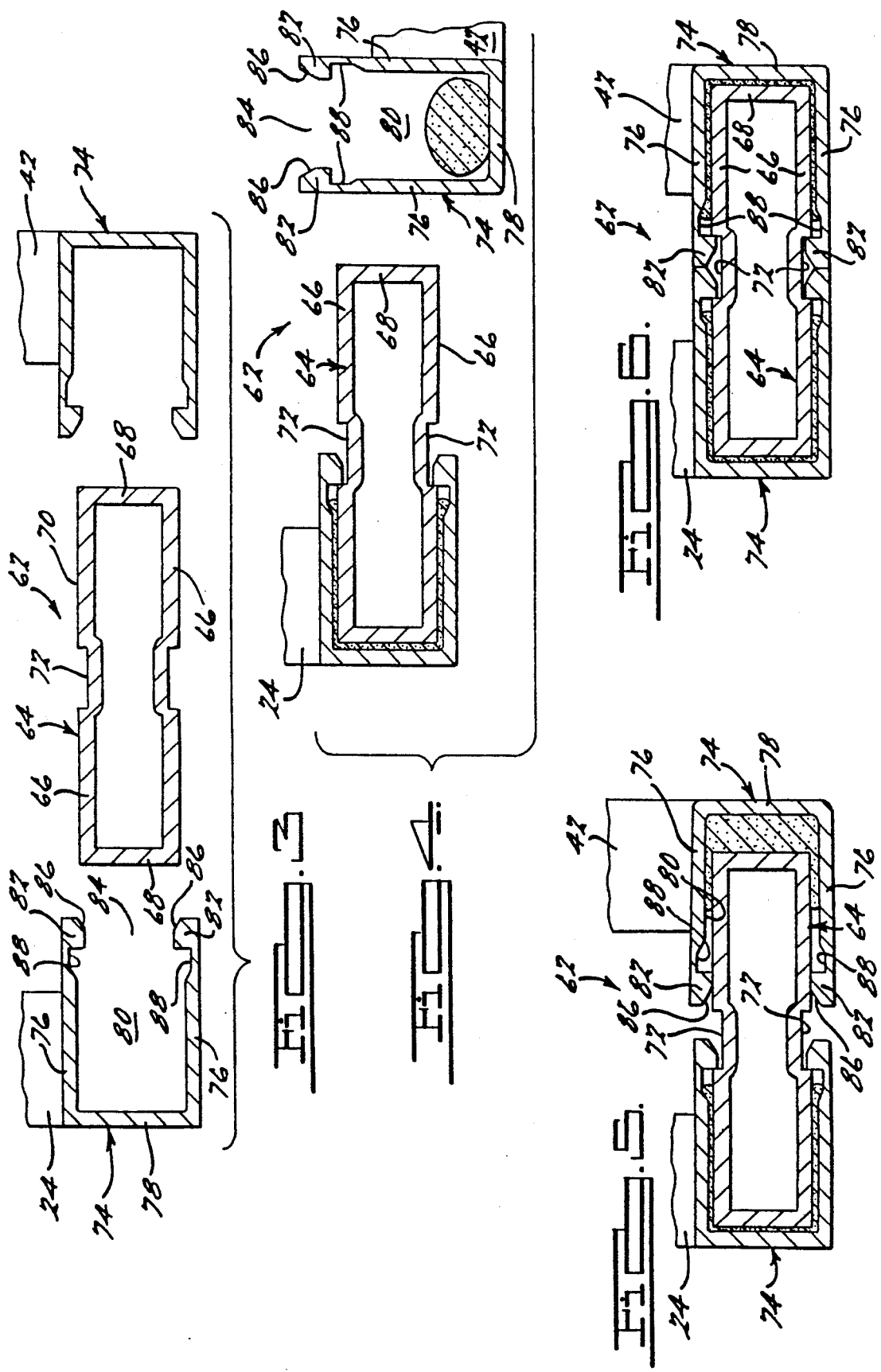

SPACE FRAME JOINT CONSTRUCTION

BACKGROUND OF THE INVENTION

1. Field of the Invention

The present invention relates generally to frame structures for automotive vehicles and more specifically to a joint used in the construction of such frames from tubular members.

2. Description of Related Art

It is known to construct frames defining the general shape of an automotive vehicle and for supporting its various load bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frame."

It is known to fabricate such space frames from a number of tubular members that are joined by fixed connectors to define the general shape of the vehicle. While this approach provides a distinct advantage in weight and in the tooling cost of manufacturing over the conventional fabrication of unibody construction through massive stampings, it suffers from the disadvantage that the connectors utilized for joining the tubular members together tend to be massive and expensive to fabricate and assemble. This approach also suffers from the disadvantage that assembly of major vehicle space frame components may be complex and time consuming, thereby requiring long residence times in a framing fixture. Further, this approach suffers from the disadvantage that there is no positive containment of adhesive or provision of optimum gap widths.

SUMMARY OF THE INVENTION

Accordingly, the present invention is a space frame for an automotive vehicle including a plurality of longitudinally extending structural members having means forming a channel. The space frame also includes a connector adapted to be disposed in the channel of the structural members and joint means for joining the connector and the structural members together.

Additionally, the present invention is a method of constructing a space frame for an automotive vehicle. The method includes the steps of forming a plurality of longitudinally extending structural members having a channel and disposing a connector in the channel. The method also includes the steps of joining the connector and structural members together.

One advantage of the present invention is that a joint construction and space frame are provided for an automotive vehicle. Another advantage of the present invention is that the joint construction provides flush surfaces between structural members. Yet another advantage of the present invention is that the joint construction provides a gap for adhesive and containment of adhesive overflow. Still another advantage of the present invention is that the joint construction is compatible with high speed adhesive application and assembly. A further advantage of the present invention is that the joint construction provides snap-in, self fixturing for bonded members, thereby eliminating long residence times in a framing fixture. A still further advantage of the present invention is that an aluminum joint construction is provided which is lightweight and lower in cost to fabricate and assemble.

Other objects, features, and advantages of the present invention will be readily appreciated as the same becomes better understood after reading the following description taken in conjunction with the accompanying drawings.

BRIEF DESCRIPTION OF THE DRAWINGS

FIG. 3 is an exploded view of the joint construction of FIG. 2 illustrated as unassembled.

FIG. 4 is a view similar to FIG. 3 illustrating the joint construction partially assembled.

FIG. 5 is a view similar to FIG. 4 illustrating the joint construction further assembled.

FIG. 6 is a view similar to FIG. 5 illustrating the joint construction completely assembled.

DESCRIPTION OF THE PREFERRED EMBODIMENT(S)

Figure 1:
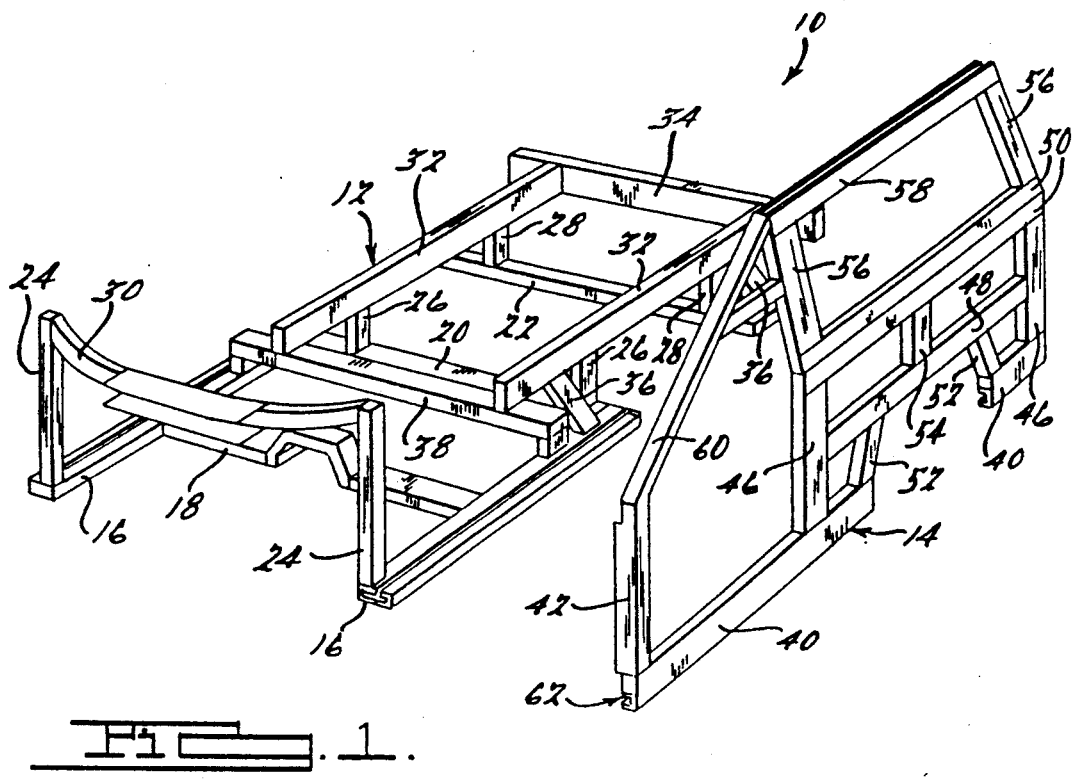
FIG. 1 is a perspective view of a space frame according to the present invention.
Figure 2:
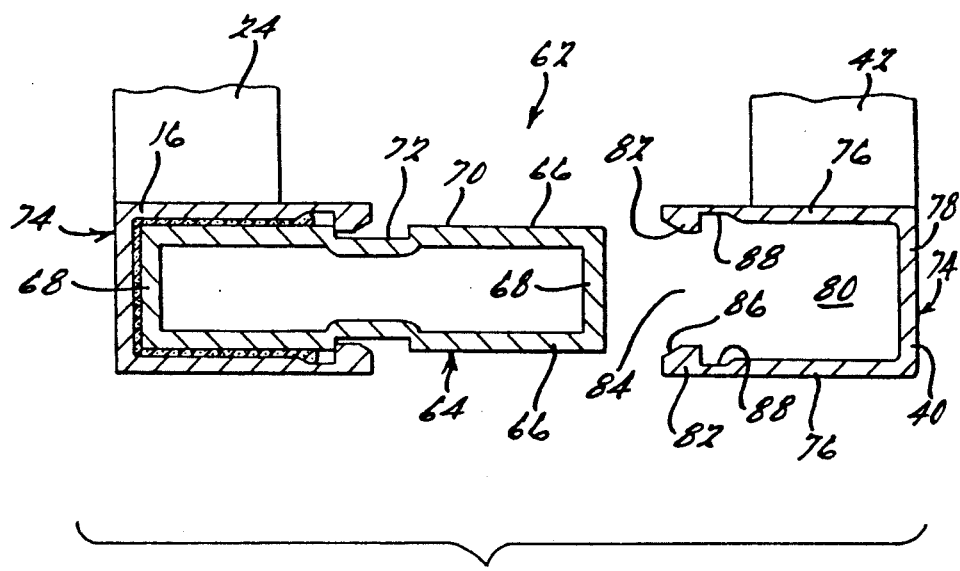
FIG. 2 is a partial exploded and fragmentary view of a joint construction, according to the present invention, of the space frame of FIG. 1.

Turning now to the drawings and in particular to FIG. 1 thereof, a space frame 10 according to the present invention is illustrated for an automotive vehicle. The space frame 10 includes a center structural subassembly 12 and a side structural subassembly 14. The center structural subassembly 12 includes longitudinally extending side rails 16 and laterally extending front, center, and rear cross members 18, 20, 22 interconnecting the side rails 16. The center structural subassembly 12 also includes vertically extending front, center, and rear pillar members 24, 26, 28, connected to the side rails 16, center cross member 20, and rear cross member 22, respectively. The center structural subassembly 12 includes an upper cross member 30 interconnecting the front pillar members 24 and longitudinally extending upper rail members 32 interconnecting the center and rear pillar members 26, 28. The center structural subassembly 12 also includes a laterally extending end cross member 34 interconnecting the upper rail members 32 and inclined members 36 interconnecting the upper rail members 32 and side rails 16. The center structural subassembly 12 may include an elevated and laterally extending cross member 38 interconnecting the side rails 16. The center structural subassembly 12 may include other members to support an automotive engine and its associated componentry (not shown).

The side structural subassembly 14 includes longitudinally extending side rails 40 and vertically extending front, center, and rear pillar members 42, 44, 46 connected to the side rails 40. The side structural subassembly 14 also includes longitudinally extending center and upper rails 48, 50 interconnecting the center and rear pillar members 44 and 46. The side structural subassembly 14 includes inclined members 52 interconnecting the side rails 40 and center rail 48 and a vertically extending center pillar 54 interconnecting the center and upper rails 48 and 50. The side structural subassembly 14 also includes inclined and vertically extending upper pillar members 56 connected to the upper rails 50, a longitudinally extending upper rail member 58 interconnecting the upper pillar members 56, and an inclined member 60 interconnecting the front pillar member 42 and one end of the upper rail member 58. It should be appreciated that outer decorative panels (not shown) are adapted to be mounted to the side structural subassembly 14 by suitable means such as an adhesive to be described.

The space frame 10 may include other structural members which are not specifically described to form the space frame 10 illustrated in FIG. 1. The structural members are pre-assembled into the structural subassemblies 12, 14 using suitable means such as welding or an adhesive to be described. The structural members of the space frame 10 are tubular members extruded from a metal material such as an aluminum or steel material. Preferably, the tubular members have a generally rectangular cross-section. It should be appreciated that other suitable cross-sectional shapes and materials may be used. It should also be appreciated that the structural members may be continuous or discontinuous to form a two-piece member. It should further be appreciated that a side structural subassembly 14 is constructed for each side of the center structural subassembly 12 although one is illustrated.

The space frame 10 also includes joint constructions, according to the present invention and generally indicated at 62, for joining or attaching the center structural subassembly 12 and side structural subassembly 14 together. The joint constructions 62 provide a substantially flush outer surface between structural members of the center and side structural subassemblies 12 and 14. It should be appreciated that the joint constructions 62 may be used for joining together other structural members of the space frame 10.

Referring to FIGS. 2 through 6, a joint construction 62 will be specifically described for joining the side rail 16 of the center structural subassembly 12 to the side rail 40 of the side structural subassembly 14. The joint construction 62 includes a connector, generally indicated at 64, having a generally rectangular shape. The connector 64 has a pair of side walls 66 and end walls 68 with an outer surface 70. The connector 64 also has a generally rectangular groove 72 extending inwardly from the outer surface 70 of the side walls 66 on opposed sides thereof for a function to be described.

The side rails 16 and 40 each have a connector portion, generally indicated at 74. The connector portion 74 has a generally C-shaped cross section. The connector portion 74 has a pair of side walls 76 interconnected by a base wall 78. The side walls 76 are spaced vertically and substantially parallel to each other. The side walls 76 and base wall 78 cooperate to form a channel 80 extending longitudinally therethrough and adapted to receive the connector 64. The channel 80 has a width greater than the connector 64 to provide a gap or space therebetween for a function to be described The connector portion 74 also has a pair of opposed tongues or tabs 82 at the ends of the side walls 76 for a function to be described. The tabs 82 extend outwardly and inwardly across the channel 80 to form an open end 84 having a width less than a width of the channel 80. The tabs 82 also have a chamfer or lead-in contour 86 to facilitate engagement of the connector 64 in the channel 80. The connector portion 74 also includes a groove or recess 88 prior to and adjacent the tabs 82 which acts as an overflow reservoir for excess adhesive and provides a thinned-down wall section to allow elastic springing of the tabs 82 into the grooves 72 upon full engagement.

In operation, the structural members of the space frame 10 are extruded as straight sections. The structural members are then formed or bent as illustrated in FIG. 1 using conventional equipment and methods. The structural members of the space frame 10 are joined or connected to each other with an adhesive such as a structural adhesive. Preferably, the structural adhesive is an acrylic adhesive. An example of such an acrylic adhesive is found under the trade name Versilok acrylic adhesive (AD5830) of the Lord Corporation. It should be appreciated that other suitable adhesives may be used. It should also be appreciated that the structural members of the space frame 10 are pre-assembled to form the structural subassemblies 12 and 14 illustrated in FIG. 1.

For the joint construction 62, a method or sequence of construction or assembly will be described. As illustrated in FIG. 4, the connector portion 74 is orientated such that the open end 84 of the channel 80 is vertical or facing upward to accept the adhesive. An operator or a device such as a robot (not shown) applies a bead of adhesive into the channel 80. As illustrated in FIG. 5, the connector portion 74 is rotated ninety degrees (90°) with the adhesive toward the connector 64. The connector 64 is moved toward the open end 84 of the channel 80 with a framing fixture (not shown). When the connector 64 engages the lead-in contour 86 of the tabs 82, the side walls 76 of the connector portion 74 flex or expand slightly and the connector 64 is moved into the channel 80. As the connector 64 makes contact with the adhesive, the adhesive flows in a space between the connector 64 and connector portion 74. The connector 64 is moved further into the channel 80 until the tabs 82 are aligned with the groove 72 on the connector 64. When this occurs, the side walls 76 of the connector portion 74 will deflect back to the original shape to dispose the tabs 82 in the grooves 72 to lock the connector 64 in the channel 80 of the connector portion 64, as illustrated in FIG. 6. Excess adhesive flows into the overflow recess 88 if necessary. It should be appreciated that the tabs 82 contact the side walls 66 to prevent the connector 64 from exiting the channel 80.

Accordingly, the joint construction 62 provides a self-fixturing feature requiring no secondary fastening. A snap-in feature is incorporated into each joint construction 62 which rigidly holds structural members together until the adhesive cures and beyond. The joint construction 62 prevents dripping and running of excess adhesive.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is

1. A space frame for an automotive vehicle comprising:
   a plurality of longitudinally extending structural members, each of said structural members having means forming a channel;
   a connector disposed in said channel of each of said structural members; and
   joint means for joining said connector and said structural members together, said joint means comprising means forming a groove on each of a pair of opposed sides of said connector, and means forming a tab on each of a pair of opposed sides of each of said structural members adjacent said channel thereof, said tabs being disposed in said grooves.

2. A space frame as set forth in claim 1 further including means for securing said connector to said structural members.

3. A space frame as set forth in claim 2 wherein said securing means comprises adhesive disposed between said connector and said channels.

4. A space frame as set forth in claim 1 wherein each of said channel forming means comprises a pair of side walls spaced and substantially parallel to each other and a base wall interconnecting said side walls.

5. A space frame as set forth in claim 4 wherein, for each of said channel forming means, said side walls and said base wall are integral.

6. A space frame as set forth in claim 4 wherein, for each of said channel forming means, said side walls and said base wall are formed as one-piece.

7. A space frame as set forth in claim 1 wherein said connector is formed as an extrusion.

8. A space frame as set forth in claim 1 wherein said structural members are formed as an extrusion.

9. A space frame as set forth in claim 1 wherein said connector and said structural members are made of an aluminum material.

10. A space frame as set forth in claim 1 wherein said connector and said structural members are made of a steel material.

11. A space frame for an automotive vehicle comprising:
    a plurality of longitudinally extending structural members, each of said structural members having means forming a channel;
    a connector having a pair of opposed grooves and being disposed in said channel of each of said structural members; and
    an adhesive disposed between said connector and said channels;
    each of said channel forming means comprising a pair of side walls spaced and substantially parallel to each other and a base wall interconnecting said side walls, and a tab at a free end of each of said side walls adjacent said channel thereof, said tabs being disposed in said grooves to join said structural members and said connector together.

12. A method of constructing a space frame for an automotive vehicle, said method comprising the steps of:
    forming a plurality of longitudinally extending structural members, each of the structural members having a channel and a tab on each of a pair of opposed sides of the channel;
    forming a connector with a groove on each of a pair of opposed sides thereof;
    disposing the connector in the channel of each of the structural members; and
    joining the connector and the structural members together by deflecting the tabs as the connector is disposed in the channels and disposing the tabs in the grooves.

13. A method as set forth in claim 12 further including the step of securing the connector to the structural members.

14. A method as set forth in claim 13 wherein said step of securing comprises disposing adhesive in the channels prior to disposing the connector in the channels.

15. A method of constructing a space frame for an automotive vehicle, said method comprising the steps of:
    forming a plurality of longitudinally extending structural members having a channel;
    orientating the structural member with the channel facing upward;
    disposing adhesive in the channel;
    disposing a connector in the channel;
    joining the connector and the structural members together; and
    securing the connector to the structural members.

16. A method of constructing a space frame for an automotive vehicle, said method comprising the steps of:
    forming a plurality of longitudinally extending structural members having outer surfaces and a channel with tabs on opposed sides of the channel;
    forming a connector with grooves on opposed sides;
    orientating the structural members with the channel facing upward;
    disposing adhesive in the channel;
    disposing a connector in the channel; and
    deflecting the tabs as the connector is disposed in the channel and disposing the tabs in the grooves.

* * * * *